(12) United States Patent
Szydlowski

(10) Patent No.: US 6,667,014 B1
(45) Date of Patent: Dec. 23, 2003

(54) CATALYTIC REACTOR AND CATALYST CONFIGURATION DESIGNED TO REDUCE CATALYST SLUMPING AND CRUSHING

(75) Inventor: Donald F. Szydlowski, Ellington, CT (US)

(73) Assignee: UTC Fuel Cells, LLC, So. Windsor, CT (US)

( * ) Notice: Subject to any disclaimer, the term of this patent is extended or adjusted under 35 U.S.C. 154(b) by 528 days.

(21) Appl. No.: 09/158,715

(22) Filed: Sep. 22, 1998

(51) Int. Cl.$^7$ .............................. B01J 35/02; B01J 8/00
(52) U.S. Cl. ...................... 422/222; 422/177; 422/180; 422/211
(58) Field of Search .................. 422/194, 191–198, 422/177, 180, 211, 222

(56) References Cited

U.S. PATENT DOCUMENTS 5,232,672 A * 8/1993 Spadaccini et al. .......... 422/198
5,733,347 A * 3/1998 Lesieur ....................... 422/191

* cited by examiner

Primary Examiner—Hien Tran
(74) Attorney, Agent, or Firm—William W. Jones

(57) ABSTRACT

A steam reformer for converting a reactor fuel into a product gas includes a catalyst bed which is formed from catalyst blocks which are configured so as to match the configuration of the catalyst bed chamber. The steam reformer side walls have a thermal coefficient of expansion which is greater than the thermal coefficient of expansion of the catalyst. By forming specifically configured catalyst bed blocks, slumping and subsequent damage of the catalyst blocks is eliminated.

3 Claims, 3 Drawing Sheets

CATALYTIC REACTOR AND CATALYST CONFIGURATION DESIGNED TO REDUCE CATALYST SLUMPING AND CRUSHING

TECHNICAL FIELD

The present invention relates to an improved catalytic reactor and a catalyst configuration, and particularly to a catalytic reactor and catalyst configuration which resists catalyst slumping and crushing.

BACKGROUND OF THE INVENTION

Steam reformation of a hydrocarbon fuel, into a useful process gas, is well known in the art. Steam reformation is accomplished by causing the raw fuel and steam to contact a heated catalyst bed. Typically, temperatures in steam reformers can approach about 1,600° F. Conventional catalytic steam reformer reactors are disclosed in U.S. Pat. No. 4,071,330, U.S. Pat. No. 4,098,587, U.S. Pat. No. 4,098,588, U.S. Pat. No. 4,098,589 and U.S. Pat. No. 4,203,950.

Catalytic steam reformer reactors may experience a problem due to thermal cycling. During start-up, the steam reformer's temperature increases and the reformer walls and the catalyst expand at different rates. The volume between the reformer walls, i.e., the volume of the reformer chamber, expands more than the volume of the catalyst because the reformer walls have a higher coefficient of thermal expansion than the catalyst. The outer reformer wall expands the most because it is in direct contact with combustion gases, while the inner reformer wall also expands, but to a lesser degree. The catalyst expands to the least degree due to the low coefficient of thermal expansion of the catalyst, thereby resulting in a catalyst volume which is less than the expanded volume of the reformer chamber. Once the reformer walls expand, gravity acts upon the catalyst and causes the catalyst to settle downwardly in the reformer chamber, thereby filling voids caused by the increase in chamber volume. This well known phenomenon is known as catalyst "slumping". Slumping can occur in any catalytic reformer having reformer walls with a thermal coefficient of expansion which is greater than the thermal coefficient of expansion of the catalyst particles. During shut-down, when the reformer cools, the reformer walls contract. Since the catalyst has been redistributed downwardly during the heating cycle, cooling of the catalytic reformer and contraction of the walls thereof, results in the reformer walls exerting a mechanical pressure on the catalyst. When this pressure is applied to the catalyst, the weight of the catalyst bed, and friction forces interacting between the catalyst and the reformer walls prevent the catalyst from rising in the catalytic reformer. Some of this mechanical pressure is absorbed by the catalyst and the reformer walls, but the remaining pressure crushes some of the catalyst to form catalyst particles or dust.

Catalyst slumping and resultant crushing causes several problems within a catalytic reformer. The crushed catalyst particles can create a higher drag coefficient than the original catalyst particles, so the product gas stream pressure may entrain the catalyst particles and float them out of the reaction chamber. Other well known problems can result from slumping and crushing of catalyst pellets in the reformer.

The aforesaid U.S. Pat. No. 4,203,950 addresses reformer catalyst slumping and crushing but the solution taught by this patent requires that certain variables with respect to the design of the reformer and the catalyst, such as dimensions and elasticity ranges, be within certain values. The solution offered by this patent is therefore constrained in use.

U.S. Pat. No. 5,718,881 also addresses the problem of reformer catalyst slumping and crushing. The solution taught by this patent requires the inclusion of a plurality catalyst support assemblies disposed in the catalyst bed and stacked on top of each other. This patent thus requires the use of adjunct reformer components.

It would be desirable to provide an improved and simplified catalytic reformer and catalyst configuration which reduces catalyst slumping and crushing, and does not unduly constrain the utility of the reformer or require adjunct components.

DISCLOSURE OF THE INVENTION

This invention relates to a fuel gas reformer assembly and a catalyst component configuration which is designed so as to eliminate catalyst slumping and crushing which would otherwise result from operation of the reformer. The catalyst bed in the reformer of this invention is formed from a plurality of catalyst blocks which are stacked one atop the other. The catalyst blocks include passages for the passage of the fuel gas and steam mixture. The blocks are sized and shaped so that they fit snugly in the catalyst bed chamber. When the reformer is brought from ambient to operating temperatures, the walls of the catalyst bed chamber will expand in a known manner but the size and shape of the catalyst blocks will not permit the blocks to move vertically relative to one another. The fuel gas to be reformed enters the reformer housing at a lower end thereof, migrates upwardly through the catalyst blocks and is then directed back downwardly through the reformer housing. The reformed fuel gas then exits the reformer housing through the lower portion thereof.

The heat needed to drive the reaction is supplied by a heated gas stream which enters the reformer housing through the upper end thereof and is exhausted from the housing through the lower end thereof. The aforesaid manner of supplying heat to the reformer housing results in the upper end of the reformer housing being hotter than the lower end thereof. This, in turn results in the upper end of the reformer catalyst container wall, which is steel, expanding outwardly to a greater degree than the lower end thereof. During normal operation of the reformer, the temperatures at the upper end of the catalyst bed will typically be in the range of about ambient to about 1,200° F., and the temperatures at the lower end of the catalyst bed will typically be in the range of about ambient to about 800° F. During down time, the reformer temperatures will be at ambient levels. When the reformer temperatures are at ambient levels, the reformer housing walls will contract. As noted above, when the reformer wall components expand during operation of the reformer, the catalyst blocks will expand to a lesser degree than the metal wall components, but since the blocks, due to their size and shape, cannot move vertically in the catalyst bed chamber, the catalyst blocks cannot slump into the expanded volume in the reformer.

In order to eliminate catalyst slumping and subsequent crushing, the catalyst blocks are sized and shaped so as to conform substantially to the shape and thickness of the catalyst bed chamber. For example, if the catalyst bed chamber is annular in shape, then the catalyst blocks will be curvilinear, so that a predetermined number of the catalyst blocks will provide the 360° curvature needed to fill one level of the catalyst bed chamber. The shape and size of the blocks should be such that the gas stream is forced to flow in a tortuous path which substantially simulates that which occurs in a random packing of catalyst pellets such are are found in a reactor of the type described in the prior art.

It is therefore an object of the present invention to provide a fuel gas reformer assembly wherein catalyst slumping resulting from thermal cycling of the reformer is eliminated.

It is an additional object of this invention to provide a fuel gas reformer of the character described wherein catalyst crushing resulting from thermal cycling is also eliminated.

It is a further object of this invention to provide a catalyst block configuration for use in a fuel gas reformer assembly of the character described which eliminates the crushing and slumping problems.

These and other objects of the invention will become more readily apparent from the following detailed description thereof when taken in conjunction with the accompanying drawings in which:

SPECIFIC MODE FOR CARRYING OUT THE INVENTION

Figure 1:
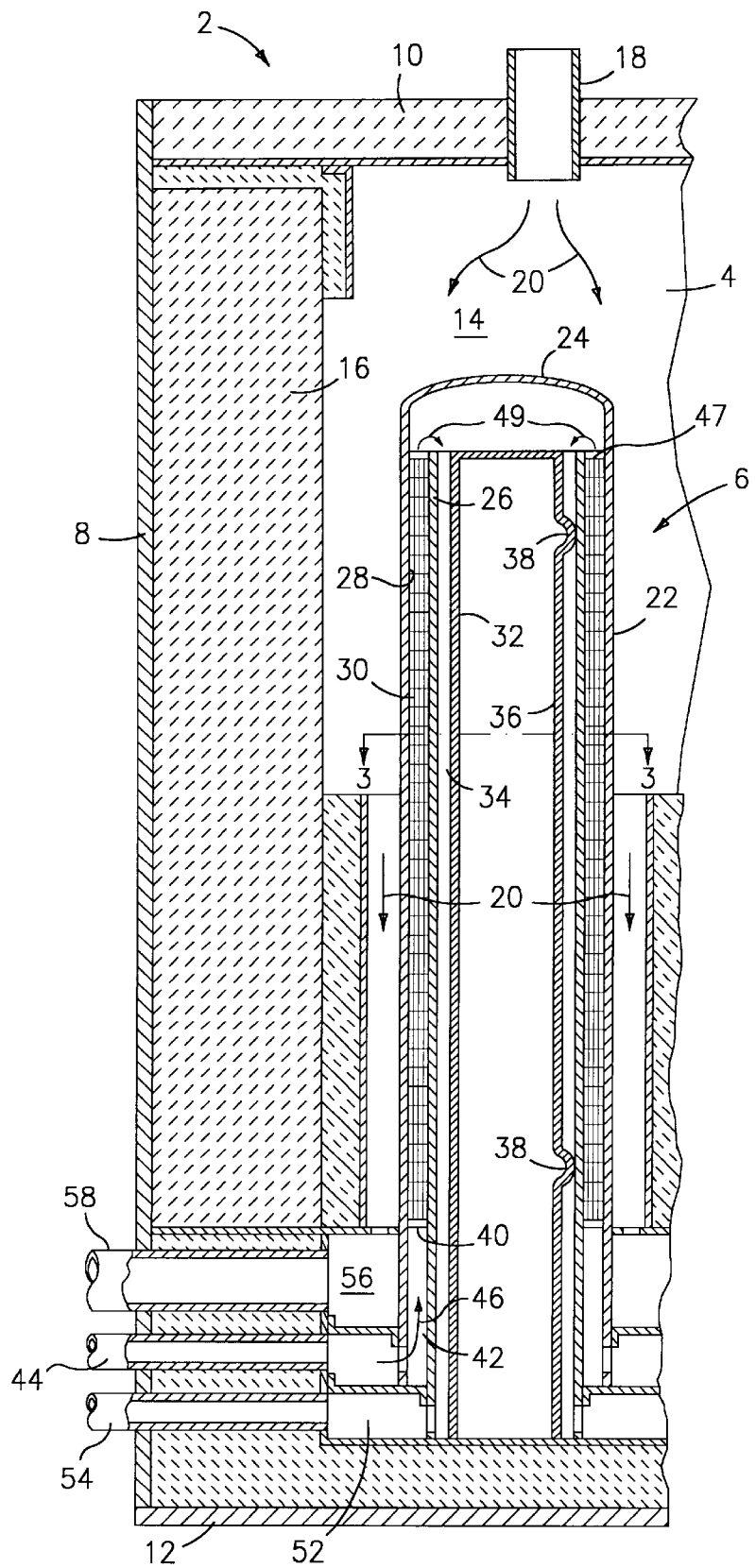
FIG. 1 is a schematic fragmented view of a reformer assembly formed in accordance with this invention.

Referring now to the drawings, FIG. 1 is a fragmented view of an embodiment of a fuel reformer assembly which is suitable for use in a fuel cell power plant assembly, and; which is denoted generally by the numeral 2 and which is formed in accordance with this invention. The reformer assembly 2 includes a cylindrical housing 4 and a plurality of catalyst-filled tubes 6 which are arrayed inside of the housing 4. The housing 4 has an outer side wall 8, a top cover wall 10, and a lower base wall 12. The interior burner cavity 14 of the housing 2 is thermally insulated by layers of insulation 16, so as to retain the necessary reaction temperatures in the interior burner cavity 14. Heated gas streams consisting of combustion products are supplied to the interior burner cavity 14 via a plurality of burner tubes 18 which extend through the top cover wall 10 the heated gas streams flowing downwardly into the interior burner cavity 14, as indicated by arrows 20. The heated gas streams then enter a manifold 56 and exit the reformer assembly 2 via at least one outlet pipe 58.

Each of the catalyst tubes 6 includes an outer side wall 22 and a closed top wall 24. An inner wall 26 is spaced inwardly of the tube side wall 22 and defines therewith an annular catalyst bed 28 which is filled with catalyzed blocks 30. A suitable catalyst block can consist of nickel metal impregnated on an alumina ceramic support. A closed innermost tube 32 is disposed inside of the annular wall 26. The tube 32 includes a sidewall 36 which combines with the annular wall 26 to define an annular fuel gas flow path 34. The tube sidewall 36 includes a plurality of protrusions 38 which contact the annular wall 26.

The catalyst bed 28 is supported on a perforated plate 40 which is welded only to wall 26 so as to allow freedom of movement between wall 26 and wall 22, and which is disposed above a fuel gas inlet plenum 42. Fuel gas enters the plenum 42 through pipe 44 and flows upwardly through the perforated plate 40, as indicated by arrows 46. The fuel gas stream continues to flow upwardly until it leaves the catalyst bed 28 whereupon it reverses its direction of flow, as indicated by arrows 49, and then flows downwardly through the fuel gas flow path 34 to a manifold 52. The reformed fuel gas stream then leaves the reformer assembly 2 through at least one outlet pipe 54. The catalyst blocks 30 are stacked, one atop another, on the perforated plate 40. At the top of the catalyst and support assemblies is a perforated plate 47 which is welded only to wall 26 so as to allow freedom of movement between walls 26 and 22, and which prevents upward movement of the catalyst blocks in the annular catalyst bed 28.

Figure 2:
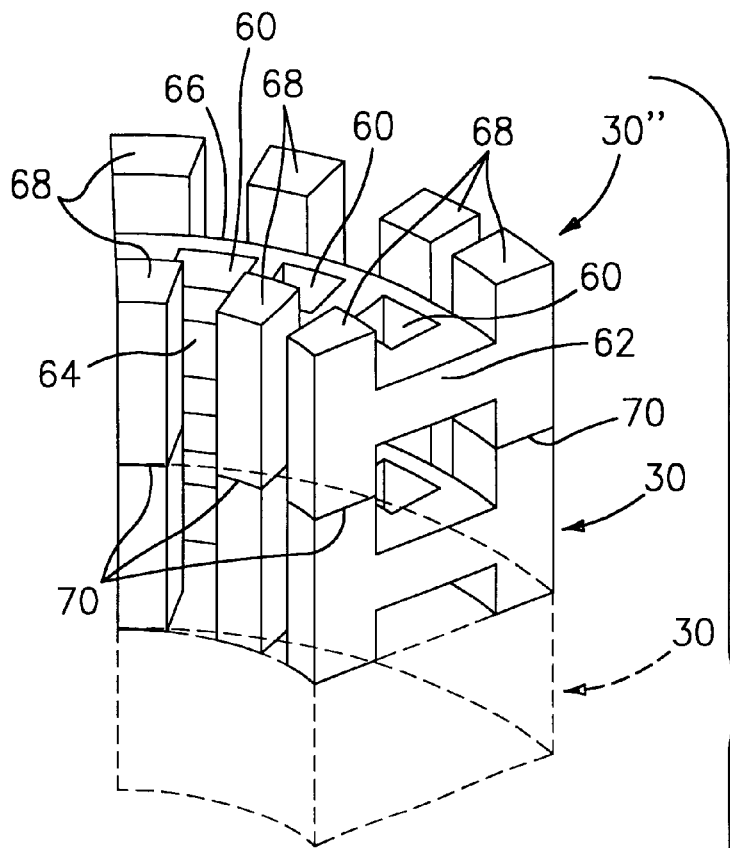
FIG. 2 is a perspective view of a stack of one embodiment of catalyst blocks formed in accordance with this invention.
Figure 2:
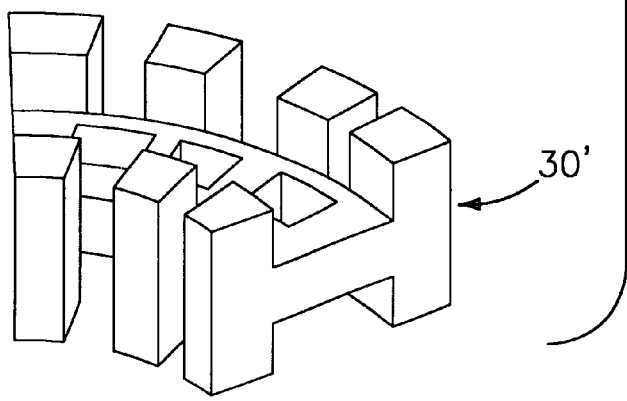

Referring now to FIG. 2, there is shown a preferred configuration of a catalyst block 30 which is formed in accordance with this invention. It will be understood that the blocks 30 are stacked in the annular chamber 28, one atop the other, from a lowermost block 30' to an uppermost block 30". The blocks 30 shown in FIG. 2 include a plurality of central through gas passageways 60 which extend through a central web 62. The inner and outer surfaces of the block 30 have inner and outer gas passage channels 64 and 66 respectively, which extend vertically through the block 30. The block 30 is also provided with upper and lower crowns 68 and 70 which serve as support surfaces for the stacked blocks 30. The passageways 60, and the channels 64 and 66 allow the fuel gas to filter upwardly through the catalyst blocks 30 with a relatively low pressure head. The inclusion of the crowns 68 and 70 serves to increase the surface area of each of the blocks 30 so as to enhance the area of catalyst contact with the fuel gas flowing through the catalyst bed. It will be understood that the entire external surface of the blocks 30, including the passages 60 and channels 64, is coated with a suitable nickel catalyst.

Figure 3:
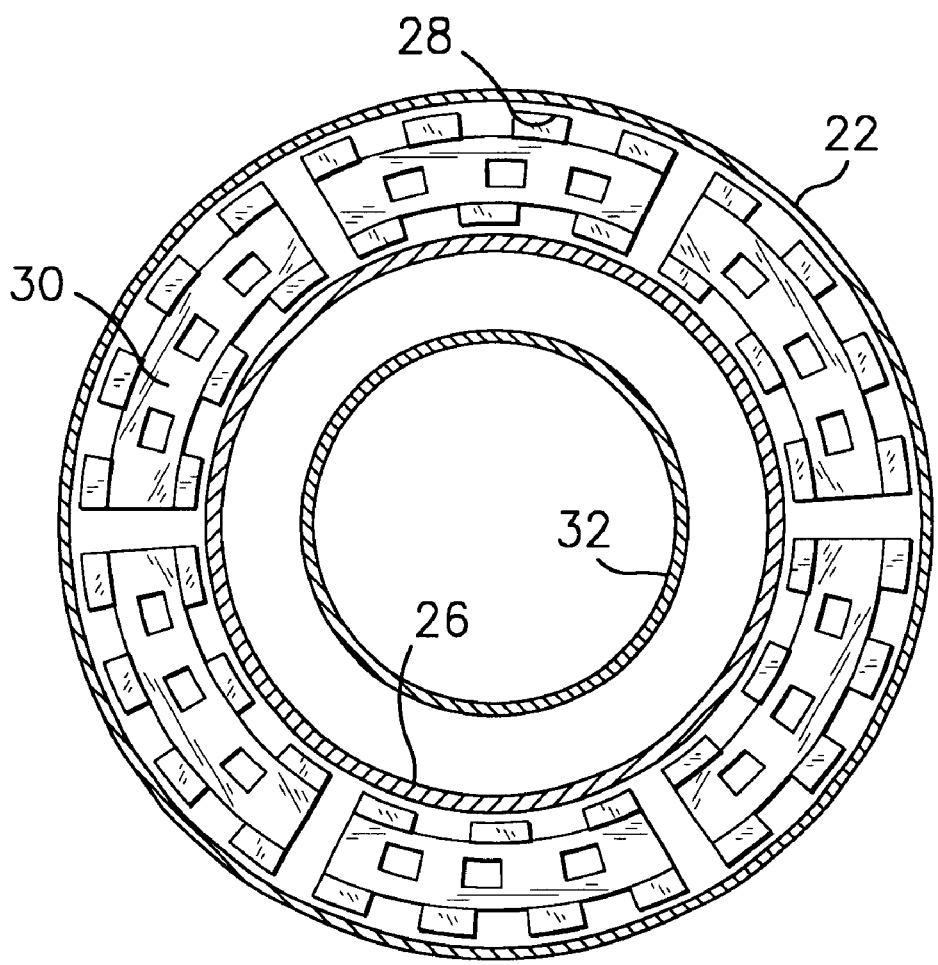
FIG. 3 is a cross sectional view of the reformer assembly taken along line 3—3 of FIG. 1.

Referring now to FIG. 3, it will be noted that the catalyst blocks 30 have a curved configuration that conforms to the annular configuration of the catalyst bed chamber 28. The blocks 30 essentially fill the annular chamber 28, both circumferentially and radially, while leaving sufficient open space between adjacent blocks 30 and the annular chamber walls 22 and 26 so as to allow expansion and contraction of the walls 22 and 26 when the reformer is placed in operation without the walls 22 and 26 pressing on the blocks 30. The blocks 30 should be sufficiently open so as to allow operation of the power plant at substantially ambient pressure, and the pressure drop in the catalyst bed should be about seventy inches of water in a large single catalyst tube is used, or about twenty five to thirty inches of water when a multitude of smaller catalyst tubes are used, when the system is being operated at ambient pressure. The passageways through the catalyst bed formed by the catalyst blocks 30 allow the fuel to percolate relatively slowly through the catalyst bed so as to ensure a complete catalytic conversion of the raw fuel to a hydrogen-enriched fuel gas.

It will be readily appreciated that a fuel cell power plant reformer assembly which includes a catalyst bed formed in accordance with this invention can eliminate catalyst bed damage during thermal cycling of the reformer. It will be noted that the catalyst bed blocks are configured in a manner which: allows the catalyst blocks to completely fill the catalyst bed chamber; are sized and shaped so that the catalyst blocks cannot move vertically relative to each other during thermal cycling of the reformer assembly; presents sufficient surface area in the catalyst blocks so as to allow the necessary catalytic reaction to take place; and provides sufficient clearance between the catalyst blocks and the catalyst bed chamber so as to prevent radial compression of the catalyst blocks and the chamber walls that could result in radial crushing of the catalyst blocks, but do not allow gas channeling between the reactor tube and the catalyst.

Since many changes and variations of the disclosed embodiment of the invention may be made without departing from the inventive concept, it is not intended to limit the invention otherwise than as required by the appended claims.

What is claimed is:

1. A catalyst block for use in a fuel cell power plant steam reformer assembly, said catalyst block including:
   a) a catalyst coating on all surfaces of said block;
   b) at least one internal passageway extending through a central web in said block, said internal passageway being operable to funnel a fuel through said block;
   c) at least one external channel extending through outer surfaces of said central web in said block for channeling the fuel around said block, said internal passageway and said external channel providing a degree of contact between said fuel and said catalyst coating which is sufficient to reform said fuel into a process gas that is suitable for use in powering a fuel cell power plant.

2. The catalyst block of claim 1 wherein said block is curvilinear in configuration so as to match the curvature of a curved catalyst chamber.

3. The catalyst block of claim 2 wherein there are a plurality of internal passageways and a plurality of external channels.

* * * * *